US006522038B2

(12) United States Patent
Byram

(10) Patent No.: US 6,522,038 B2
(45) Date of Patent: Feb. 18, 2003

(54) INTEGRATED AIR CONTROL VALVE USING CONTACTLESS TECHNOLOGY

(75) Inventor: Robert J. Byram, Grand Blanc, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/738,018

(22) Filed: Dec. 15, 2000

(65) Prior Publication Data

US 2002/0074890 A1 Jun. 20, 2002

(51) Int. Cl.[7] .......................... H02K 11/00; F16K 31/02

(52) U.S. Cl. ..................... 310/71; 310/69 B; 310/67 R; 310/68 R; 73/514.39; 251/129.11; 324/207.25

(58) Field of Search ......................... 310/68 B, DIG. 3, 310/DIG. 6, 67 R, 68 R, 71; 73/514.39; 251/129.11; 324/207.25

(56) References Cited

U.S. PATENT DOCUMENTS 4,982,125 A * 1/1991 Shirakawa ................ 310/68 B
5,295,409 A 3/1994 Byram et al. ............... 123/396
5,313,125 A 5/1994 Bosman et al. ......... 310/491 R
5,453,035 A * 9/1995 Jenkins .......................... 440/4
5,492,097 A 2/1996 Byrma et al. ................. 74/514
5,565,721 A * 10/1996 Knappe ................ 310/156.22
5,717,268 A * 2/1998 Carrier et al. ......... 310/156.06
5,757,179 A * 5/1998 McCurley et al. .......... 123/617
5,868,114 A * 2/1999 Kamimura et al. ......... 123/399
5,934,644 A * 8/1999 Boillat et al. .......... 251/129.11
6,043,576 A * 3/2000 Weber et al. ............... 310/239
6,070,852 A * 6/2000 McDonnell et al. ........ 123/396
6,124,710 A * 9/2000 Kordecki ................. 324/207.2
6,241,489 B1 * 6/2001 Lewin et al. ............ 417/410.1
6,257,271 B1 * 7/2001 Babin et al. ........... 137/315.17
6,288,534 B1 * 9/2001 Starkweather et al. ...... 123/617
6,407,543 B1 * 6/2002 Hagio et al. ................ 123/617

* cited by examiner

*Primary Examiner*—Burton S. Mullins
(74) *Attorney, Agent, or Firm*—Vincent A. Cichosz

(57) ABSTRACT

A control valve assembly for the rotary or linear actuation of control valves using contactless technology and the use of direct integration of electronic componentry into a lead frame interconnection assembly includes a contactless motor, a control valve in mechanical communication with the contactless motor through a gear system, and a lead frame interconnection assembly having electronic componentry relevant to the contactless motor and the control valve integrally formed therein. The contactless motor includes a commutator magnet disposed on a rotor shaft thereof. The commutator magnet is in magnetic communication with at least two commutator chips integrally formed with the lead frame interconnection assembly. The control valve includes a throttle element disposed in a throttle bore, an output shaft depending from the throttle element, and at least one position sensing magnet disposed on an end of the output shaft distal from the throttle element. The position sensing magnet is in magnetic communication with at least one position sensor integrally formed with the lead frame interconnection assembly. The throttle element may be a throttle plate rotatably positioned within the throttle bore, or it may be a linearly translatable device.

24 Claims, 3 Drawing Sheets

INTEGRATED AIR CONTROL VALVE USING CONTACTLESS TECHNOLOGY

TECHNICAL FIELD

This disclosure relates to the actuation of control valves, and, more particularly, to the rotary and linear actuation of control valves using contactless technology integrated with control valve actuation mechanisms.

BACKGROUND OF THE INVENTION

The use of motors in numerous consumer applications leads to a desire for more reliable, efficient and cost effective manufacture and fabrication of the motors. The utilization of multiple pole motors (e.g., brushless direct current (BLDC) motors) as rotational or linear actuators for use in air flow control valves poses problems that are oftentimes inimical to the efficiency of the motor manufacturing processes. One such problem results from the fabrication of a complex machined stator assembly of the motor. Such a stator assembly requires detailed, expensive, and labor-intensive manufacturing operations. Furthermore, such a machined stator assembly is commonly machine wound and installed into the housing of the motor and is not readily or easily serviced or replaced.

The multiple pole motors and rotational or linear actuators also typically require that connections be made between the motors, the actuators and a circuit board or a lead frame interconnection assembly. The connections, which are commonly made by hand, typically add additional steps to the assembly processes of the finished products. Furthermore, mechanical interconnections, such as those effectuated through soldering processes, are common in the assembly of motors for use as actuators. Such mechanical interconnections, and particular those in which soldering is used, may pose environmental and health related concerns. In either case, the issues involved are potentially threatening to the efficient and cost effective manufacture of multiple pole motors.

SUMMARY

A control valve assembly for the rotary or linear actuation of control valves using contactless technology and the use of direct integration of electronic componentry into a circuit board or lead frame interconnection assembly is described herein. The assembly includes a contactless motor, a control valve in mechanical communication with the contactless motor through a gear system, and a lead frame interconnection assembly having electronic componentry relevant to the contactless motor and the control valve integrally formed therein. The contactless motor includes a commutator magnet disposed on a rotor shaft thereof. The commutator magnet is in magnetic communication with at least two commutator chips integrally formed with the lead frame interconnection assembly. The control valve includes a throttle element disposed in a throttle bore, an output shaft depending from the throttle element, and at least one position sensing magnet disposed on an end of the output shaft distal from the throttle element. The position sensing magnet is in magnetic communication with at least one position sensor integrally formed with the lead frame interconnection assembly. The throttle element may be a throttle plate rotatably positioned within the throttle bore, or it may be a linearly translatable device positioned in the throttle bore.

DETAILED DESCRIPTION

Figure 1:
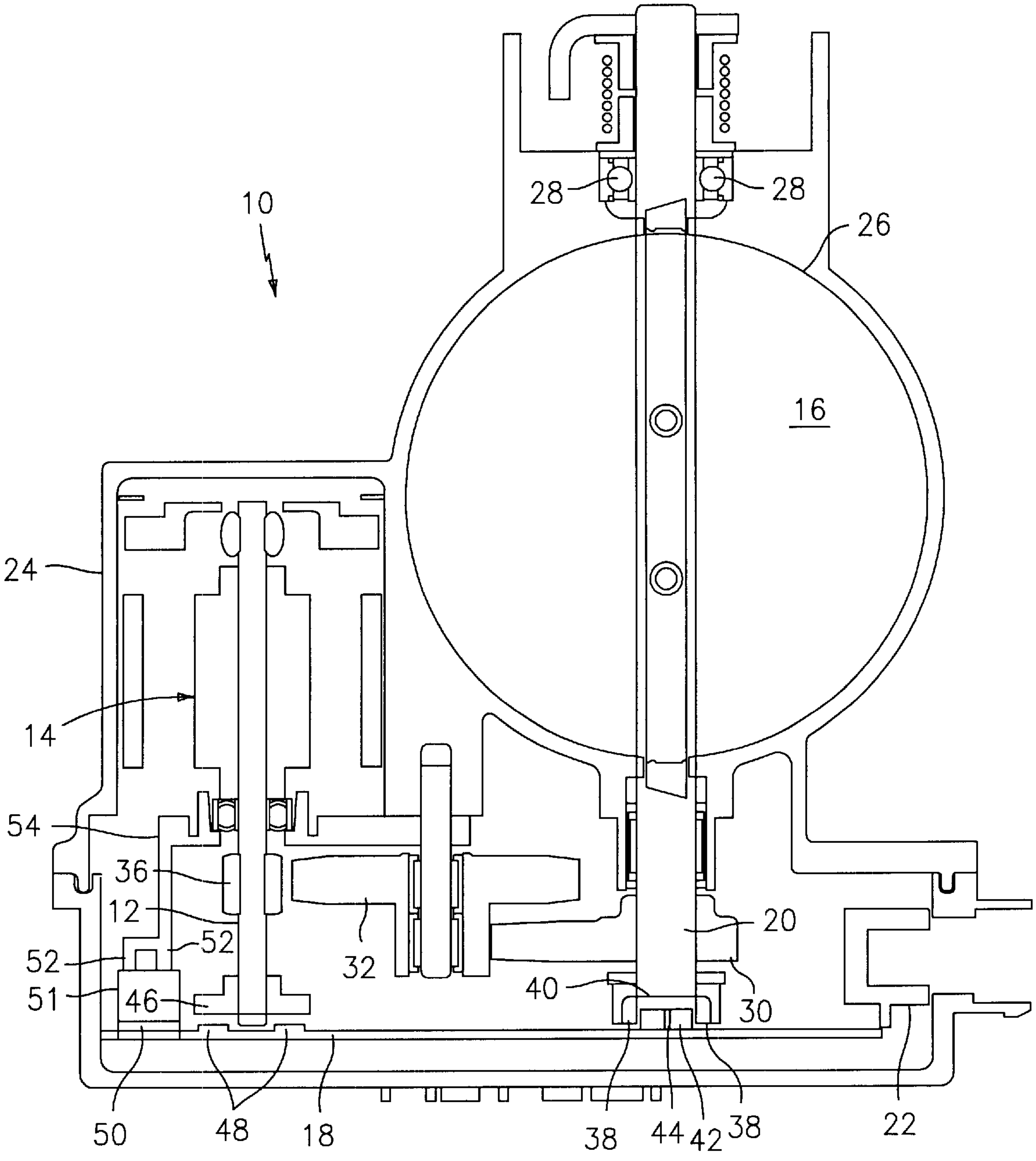
FIG. 1 is a schematic diagram of a rotational control valve assembly incorporating electronic componentry integrated into a lead frame interconnection assembly.

Referring to FIG. 1, a control valve assembly is shown generally at 10 and is hereinafter referred to as "assembly 10". Although assembly 10 can be used to control the flow of any type of gas, assembly 10 typically controls the flow of air through the rotational motion of a rotor shaft 12 of a motor, shown generally at 14. Such rotational motion generally provides for the controlled flow of air to an internal combustion engine (not shown). Assembly 10 comprises a valve, shown generally at 16, and motor 14 in operable communication with each other through a gear system. Motor 14 is in electronic communication with electronic componentry mounted on a lead frame interconnection assembly 18 having a first side positioned adjacent to the end of rotor shaft 12 and an end of an output shaft 20 of valve 16. The electronic componentry receives input data through an external electrical connector 22 on an end of the lead frame interconnection assembly 18 and transmits such input data to motor 14. Valve 16, motor 14, and lead frame interconnection assembly 18 are mechanically and electrically integrated with each other and are housed in a casing 24, such that a second side of the interconnection assembly 18 is adjacent a first end of the casing 24 and the motor 14 and the valve 16 are separated from the first end of the casing by the lead frame interconnection assembly 18.

Valve 16 comprises a throttle element connected to output shaft 20. The throttle element may be a throttle plate 26. Output shaft 20 is rotatably mounted within a throttle bore that allows air to be conducted to the intake system of the internal combustion engine. Bearings 28 support output shaft 20 and throttle plate 26 within the throttle bore and define a throttle valve axis about which throttle plate 26 rotates to meter the flow of air through the throttle bore.

Output shaft 20 is driven by an output gear 30 mounted thereon. Output gear 30 is driven by motor 14 through a configuration of idler gears 32, which are in turn driven by a pinion 36 disposed on rotor shaft 12. Pinion 36 transmits torque from motor 14 through idler gears 32 simultaneously reducing the torque and applying the torque to output gear 30.

Disposed on an end of output shaft 20 distal from throttle plate 26 are position sensing magnets 38. Position sensing magnets 38 are fixedly mounted circumferentially about an outer surface of output shaft 20 and extend beyond the end of output shaft 20 to define a recess bounded circumferentially by position sensing magnets 38 and by an end surface 40 of output shaft 20 at one end of the recess. The positioning of position sensing magnets 38 is such that magnetic flux lines radiate parallel to the axis of rotation of output shaft 20. The rotation of output shaft 20 effectuates the angular motion of position sensing magnets 38 about the throttle valve axis.

Positioned on lead frame interconnection assembly 18 proximate the end of output shaft 20 is a position sense flux carrier 42. Position sense flux carrier 42 comprises at least two crescent-shaped members having spaces therebetween arranged to form a cylindrical structure. The cylindrical structure is dimensioned to be accommodated within the recess defined by the configuration of position sensing magnets 38 disposed on the end of output shaft 20. Position sensing magnets 38 effectuate the generation of a magnetic field that varies with the rotation of output shaft 20, while position sense flux carrier 42 provides a flux path for the varying magnetic field.

A position sensor 44 is positioned on lead frame interconnection assembly 18 in a space between two of the crescent-shaped members that are arranged to form the cylindrical structure of position sense flux carrier 42. Position sensor 44 is a magnetic sensor that is responsive to variations in the magnetic field generated by the angular motion of position sensing magnets 38 about position sense flux carrier 42. The varying magnetic field sensed by position sensor 44 is thereby converted to a voltage value that is used to provide feedback to the operator of assembly 10. Such feedback typically includes data relative to the amount of rotation of throttle plate 26 within the throttle bore, thereby providing the operator with an indication of the amount of air being metered through valve 16.

A commutator magnet 46 is fixedly mounted on an end of rotor shaft 12 distal from motor 14. Commutator magnet 46 is typically cylindrical in shape and is positioned such that a gap is defined between commutator magnet 46 and lead frame interconnection assembly 18. Longitudinally defined quadrants of the cylindrical commutator magnet 46 comprise alternating north and south poles configured such that magnetic flux lines radiate parallel to the axis of rotation of rotor shaft 12.

Also positioned on lead frame interconnection assembly 18 are commutation chips 48. Commutation chips 48 are magnets incorporated directly into lead frame interconnection assembly 18 at points adjacent the gap defined by commutator magnet 46 and lead frame interconnection assembly 18.

Another piece of electronic componentry disposed on lead frame interconnection assembly 18 is an insulator displacement terminal receptor 50. Insulator displacement terminal receptor 50 is configured to receive an insulator displacement terminal 51 disposed on the ends of motor leads 52 depending from a stator connector 54 of motor 14. Insulator displacement terminal receptor 50 is positioned on lead frame interconnection assembly 18 to provide electronic communication between the electronic componentry on lead frame interconnection assembly 18 and motor 14.

External electrical connector 22 is disposed on lead frame interconnection assembly 18 to provide a port into which an electrical lead (not shown) can be received and frictionally retained. An opening in the casing 24 allows access to the external electrical connector 22. External electrical connector 22 is in electronic communication with position sensor 44, insulator displacement terminal receptor 50, and commutator chips 48 through lead frame interconnection assembly 18. The output shaft 20 and rotor shaft 12 are separated from the lead frame interconnection assembly 18 by a space. Lead frame interconnection assembly 18 has position sensor 44, insulator displacement terminal receptor 50, and commutator chips 48 integrally formed therein, thereby eliminating the need for separate mechanical interconnects and hand connections to be made.

Figure 2:
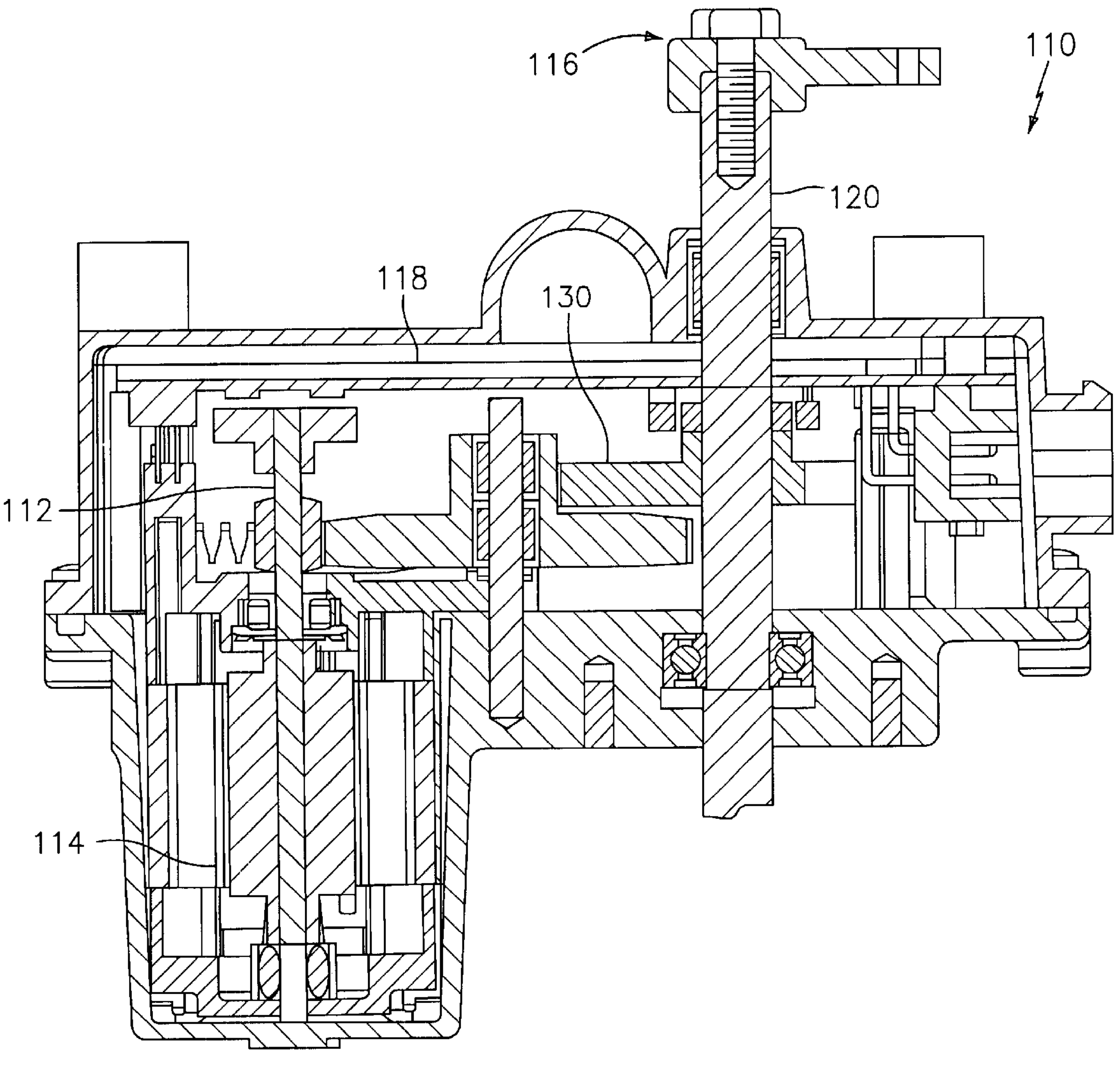
FIG. 2 is a schematic diagram of a linearly actuatable device incorporating electronic componentry integrated into a lead frame interconnection assembly.

Referring now to FIG. 2, an embodiment in which the control valve assembly is modified to provide for linear actuation of a device is shown generally at 110 and is hereinafter referred to as "assembly 110". The device (not shown) requiring linear actuation may be a valve. Assembly 110 is substantially similar in structure and componentry to assembly 10 as shown in FIG. 1. Assembly 110 comprises an output shaft 120 in operable communication with a motor 114 through a gear system. A lever 116 is disposed on and is in mechanical communication with output shaft 120. The gear system is substantially similar to the gear system of the embodiment of FIG. 1. Motor 114 is in electronic communication with electronic componentry mounted on a lead frame interconnection assembly 18 positioned adjacent to the end of a rotor shaft 112 of motor 114 and an end of output shaft 120.

The gear system includes an output gear 130 disposed on output shaft 120. As rotor shaft 112 is axially rotated, torque is transferred through the gear system to output gear 130. As output gear 130 is rotated, lever 116 disposed on output shaft 120 is correspondingly moved to effectuate the linear translation of the componentry of the linearly actuatable device.

Figure 3:
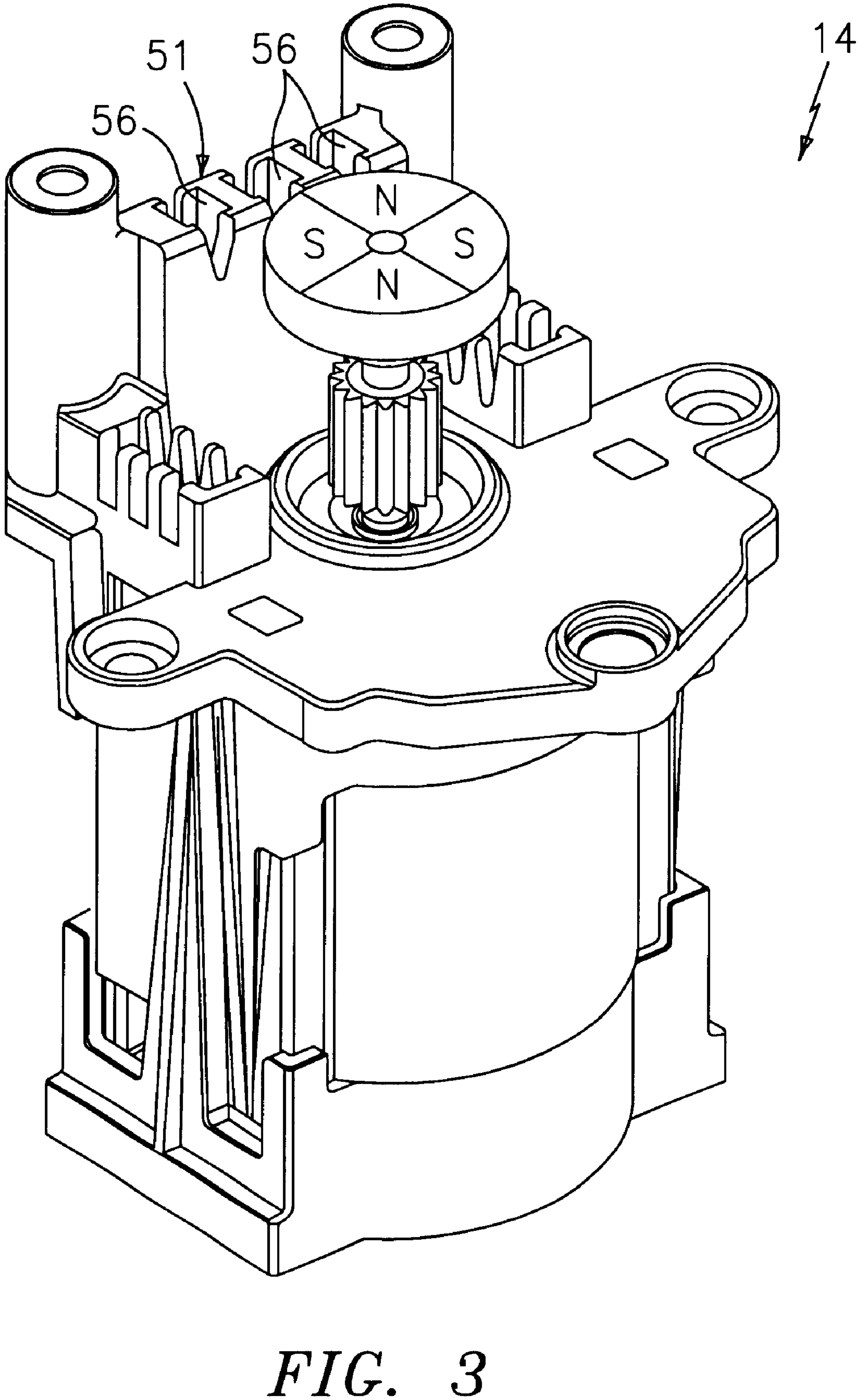
FIG. 3 is a perspective view of a motor for use in either a rotary actuatable control valve or a linearly actuatable device.

Referring now to FIG. 3, motor 14, which is incorporable in either assembly 10 of FIG. 1 or assembly 110 of FIG. 2, is shown in greater detail. Motor 14 includes motor leads 52, which are characterized by conductive elements 56 disposed within insulator displacement terminal 51. Conductive elements 56 provide for electrical communication between the stator of motor 14 and the insulator displacement terminal positioned on the lead frame interconnection assembly.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A control valve assembly, comprising:

a motor having a rotor shaft;

a control valve in mechanical communication with said motor through a gear system, said control valve having an output shaft; and a lead frame interconnection assembly having a first side and a second side, the first side facing the motor and the control valve, said lead frame interconnection assembly having electronic componentry relevant to said motor and said control valve integrally formed therein, wherein the rotor shaft and the output shaft do not pass through the lead frame interconnection assembly.

2. The control valve assembly of claim 1 wherein said motor comprises a commutator magnet disposed on a rotor shaft thereof, said commutator magnet being in electronic communication with electronic componentry mounted on said lead frame interconnection assembly.

3. The control valve assembly of claim 1 wherein said control valve comprises, a throttle element disposed in a throttle bore, the output shaft depending from said throttle element, and at least one position sensing magnet disposed on an end of said output shaft distal from said throttle element.

4. The control valve assembly of claim 3 wherein said at least one position sensing magnet is in magnetic communication with at least one position sensor integrally formed with said lead frame interconnection assembly.

5. The control valve assembly of claim 4 wherein said at least one position sensing magnet is in magnetic communication with a position sense flux carrier integrally formed with said lead frame interconnection assembly.

6. The control valve assembly of claim 3 wherein said throttle element is a throttle plate rotatably positioned in said throttle bore.

7. The control valve assembly of claim 1 wherein said lead frame interconnection assembly comprises a terminal receptor integrally formed therein, said terminal receptor being configured and dimensioned to receive a terminal from a stator connector of said motor.

8. The control valve assembly of claim 7 wherein the terminal is disposed on ends of motor leads depending from the stator connector.

9. The control valve assembly of claim 1 wherein said lead frame interconnection assembly comprises an external electrical connector integrally formed therein, said external electrical connector being configured and dimensioned to provide electronic communication between an operator and said lead frame interconnection assembly.

10. The control valve assembly of claim 9 wherein the external electrical connector is a port positioned on an end of the lead frame interconnection assembly, the port configured to frictionally receive an electrical lead.

11. The control valve assembly of claim 10 wherein the port has a rectangularly shaped cross-section.

12. The control valve assembly of claim 1 further comprising a casing, the second side of the lead frame interconnection assembly adjacent a first end of the casing.

13. The control valve assembly of claim 12 wherein the motor and the control valve are housed within the casing and separated from the first end of the casing by the lead frame interconnection assembly.

14. The control valve assembly of claim 12 wherein said lead frame interconnection assembly comprises an external electrical connector integrally formed therein, said casing comprising an opening adjacent said external electrical connector for receiving an electrical lead through the opening and retaining an electrical lead in the external electrical connector.

15. The control valve assembly of claim 1 further comprising an output gear mounted on the output shaft and a pinion disposed on the rotor shaft, the pinion and the output gear mechanically interconnected through idler gears.

16. The control valve assembly of claim 1 wherein the rotor shaft and the output shaft are separated from the first side of the lead frame interconnection assembly by a space.

17. A lead frame interconnection assembly, comprising:

a first side and a second side;

electronic componentry integrally formed on the first side of the lead frame interconnection assembly, said electronic componentry including first electronic componentry configured to be responsive to a commutator magnet disposed on a rotor shaft of a motor, and second electronic componentry configured to be responsive to at least one position sensing magnet disposed on an actuatable device; and, an external electrical connector integrally formed on one end of the lead frame interconnection assembly, said external electrical connector being configured and dimensioned as a port to frictionally receive an electrical lead to provide electronic communication between an operator and said lead frame interconnection assembly.

18. The lead frame interconnection assembly of claim 17 wherein said second electronic componentry comprises at least one magnetic sensor.

19. The lead frame interconnection assembly of claim 17 further comprising third electronic componentry having a terminal receptor, said terminal receptor being configured to receive a terminal depending from a stator connector of a motor.

20. The lead frame interconnection assembly of claim 17 wherein the port has a rectangularly shaped cross-section.

21. A control valve assembly, comprising:

a motor having a rotor shaft;

a control valve in mechanical communication with said motor through a gear system, said control valve having an output shaft; and a lead frame interconnection assembly having a first side and a second side, said lead frame interconnection assembly having electronic componentry integrally formed therein, said electronic componentry including first electronic componentry configured to be responsive to a commutator magnet disposed on a rotor shaft of a motor, and second electronic componentry configured to be responsive to at least one position sensing magnet disposed on the control valve; and, an external electrical connector integrally formed on one end of the lead frame interconnection assembly, said external electrical connector being configured and dimensioned to provide electronic communication between an operator and said lead frame interconnection assembly.

22. The control valve assembly of claim 21 wherein the output shaft of the control valve passes through the lead frame interconnection assembly.

23. The control valve assembly of claim 21 wherein the lead frame interconnection assembly further comprises third electronic componentry having a terminal receptor, said terminal receptor being configured to receive a terminal depending from a stator connector of the motor.

24. The control valve assembly of claim 21 wherein the external electrical connector is a port configured to frictionally receive an electrical lead.

* * * * *